Jan. 4, 1927.
O. B. WOODROW
1,613,004
CASTER LOCKING AND RELEASING DEVICE
Filed April 13, 1925
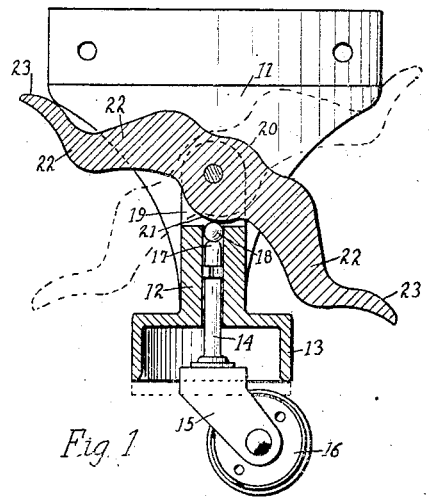
Fig. 1
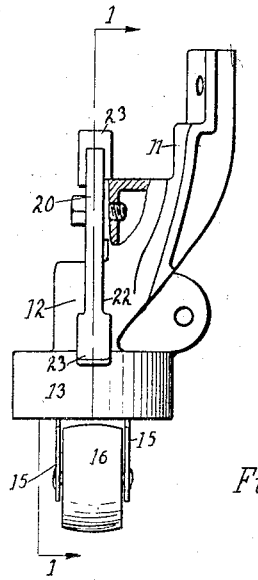
Fig. 2
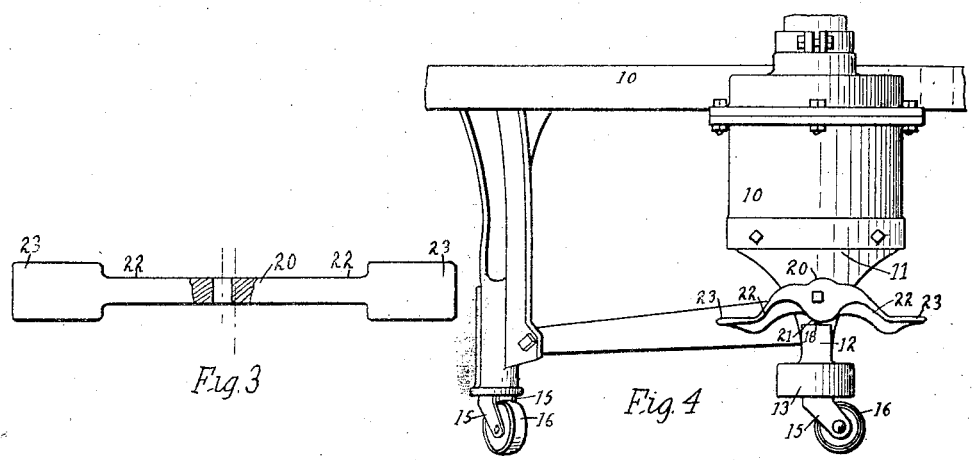
Fig. 3
Fig. 4
Inventor
O. B. Woodrow
by Owing & Hague, Attys.

Patented Jan. 4, 1927.

1,613,004

UNITED STATES PATENT OFFICE.

OLIVER B. WOODROW, OF NEWTON, IOWA.

CASTER LOCKING AND RELEASING DEVICE.

Application filed April 13, 1925. Serial No. 22,795.

My object is to provide a caster supporting device of simple, durable and inexpensive construction, especially designed to be used in connection with power operated washing machines, and whereby the operator may conveniently and easily, by foot pressure only, operate the device so that the caster may be free to rotate in its normal manner or will be locked against movement either of the caster wheel upon its own axis or of the caster wheel about the caster stem, and whereby the operator may accomplish this result either to lock or unlock the caster by a foot pressure exerted in a downward direction and in such manner that this pressure will not tend to move the washing machine or other body to which the caster is attached; and More specifically it is my object to provide a device of this character in which friction upon the top of the caster stem, such as would tend to prevent the caster wheel from rotating relative to the caster stem, will be reduced to a minimum, and also that frictional movement caused by operating the foot lever in either direction will also be reduced to a minimum, and whereby wear upon the said parts subjected to friction will also be reduced to a minimum.

My invention consists in the construction, arrangement and combination of the various parts of the device, whereby the objects contemplated are attained, as hereinafter more fully set forth, pointed out in my claim, and illustrated in the accompanying drawings, in which:

Figure 1 shows a side elevation of a washing machine leg having my improved caster device applied thereto, the caster engaging flange being shown in section and the operating lever being shown by dotted lines in its position for holding the caster in its unlocked condition, taken on the line 1—1 of Figure 2.

Figure 2 shows a side elevation of a washing machine leg having my improved caster device applied thereto.

Figure 3 shows a top or plan view of the foot lever; and

Figure 4 shows a side elevation of a portion of a washing machine frame having my improved caster applied thereto.

Referring to the accompanying drawings, I have used the reference numeral 10 to indicate such portions of a washing machine frame as are shown. For supporting the washing machine frame there are usually provided three legs, to one of which, indicated generally by the reference numeral 11, my improved caster locking and releasing device is attached.

My improved device comprises a tubular extension 12 having a circular opening to receive a caster stem, and at the bottom of the part 12 there is a circular flange 13 extended downwardly. The parts 12 and 13 are preferably formed by being cast integral with the leg 11. The caster proper comprises a caster stem 14, a caster bracket 15 and a caster wheel 16, all of the ordinary construction. The upper part of the stem 14 is rounded at 17, as clearly shown in Figure 1.

Mounted in the part 12 above the caster stem is a bearing ball 18, its top surface being projected slightly above the bottom of the slot 19 formed in the top of the body portion of the part 12, as shown in Figure 1. Pivotally mounted in this slot 19 is a locking and releasing lever which comprises a central body portion 20 having its lower edge formed on an eccentric curve as shown at 21 in Figure 1. Projecting from each side of said body portion 20 is a foot lever 22 formed with a treadle 23.

The said parts are so shaped and proportioned that when the locking and releasing lever is in a position shown by solid lines in Figure 1, the leg 11 will be raised relative to the caster stem 14 to such an extent that the locking flange 13 will stand spaced above the caster wheel 16, as shown by solid lines in Figure 2, and when the opposite end of the locking and releasing lever has been moved downwardly as shown by dotted lines in Figure 1, then the lower edge of the flange 13 will engage and rest upon the top portion of the caster wheel, thus locking the caster wheel proper against rotation and also locking the stem 14 against rotation.

In practice I have found that the bearing ball 18 performs several useful and desirable functions. When the leg 11 is in its raised position relative to the caster stem and the stem is being rotated within its support as is done when the washing machine or other object is moved from place to place, then the upper end of the stem 14 causes the bearing ball 18 at times to rotate with it, thus minimizing wear and reducing friction.

Furthermore, when the operator presses the locking and releasing lever from the position shown by dotted lines in Figure 1 to the position shown by solid lines in Figure 1, and when so doing has to raise the weight of that portion of the washing machine supported upon said caster, then the ball 18 will rotate and thus reduce wear and friction between the bearing ball and the eccentric. This is of considerable importance in a device of this character, because there must always be maintained a certain specific distance between the lower edge of the eccentric 21 and the lower edge of the flange 13, so that when the flange 13 is in its elevated position it will be clear of the caster wheel, and if said parts are subjected to considerable wear, the adjustment of the locking and releasing lever would, after a short period of time, fail to result in raising the leg far enough above the caster wheel to permit the free turning movement of the caster wheel.

I claim as my invention:

An improved caster locking and releasing device, comprising a caster having the ordinary wheel, bracket and stem, a body portion formed with a vertical opening to receive the caster stem and also formed with a downwardly extending annular flange, said flange being so shaped that when said body portion is at its downward limit relative to the caster wheel, the flange will engage the upper portion of the caster wheel and thereby prevent the rotation of the caster wheel when the caster wheel is at any angle within its complete circle of rotary movement in a horizontal plane, a bearing ball engaging the top of the stem, a lever fulcrumed directly above the upper end of the stem and formed with a cam surface to engage the bearing ball, and also formed with two treadles extended outwardly in opposite directions from the cam and so arranged that the operator may by pressing his foot upon one of the treadles raise the flange out of engagement with the caster wheel and securely hold it in such position, and by downwardly pressing his foot upon the other end of the lever he may permit the body to move downwardly relative to the caster stem until the circular flange engages and rests upon the top portion of the caster wheel, substantially as and for the purposes stated.

Des Moines, Iowa, March 5, 1925.

OLIVER B. WOODROW.